United States Patent [19]
Männistö

[11] Patent Number: 5,805,084
[45] Date of Patent: Sep. 8, 1998

[54] SYSTEM FOR ACTIVATION OF A KEYBOARD LOCK

[75] Inventor: Tapani Männistö, Halikko, Finland

[73] Assignee: Nokia Mobile Phones Ltd., Salo, Finland

[21] Appl. No.: 705,501

[22] Filed: Aug. 29, 1996

[30] Foreign Application Priority Data

Oct. 13, 1995 [FI] Finland ................................. 954893

[51] Int. Cl.⁶ ..................................................... H04Q 7/00
[52] U.S. Cl. .................. 341/22; 340/825.31; 340/825.5; 340/825.56; 379/188
[58] Field of Search ........................ 341/22; 340/825.56, 340/825.31, 825.17, 825.5; 279/188, 200, 63, 58, 59

[56] References Cited

U.S. PATENT DOCUMENTS

| | | | |
|---|---|---|---|
| 4,099,033 | 7/1978 | Murray | 379/188 |
| 4,670,747 | 6/1987 | Boras | 340/825.56 |
| 4,724,537 | 2/1988 | Monet | 379/58 |
| 4,843,385 | 6/1989 | Boras | 340/825.31 |
| 4,914,732 | 4/1990 | Henderson | 340/825.17 |
| 5,266,949 | 11/1993 | Rossi | 341/22 |
| 5,408,060 | 4/1995 | Muurinen | 200/314 |

FOREIGN PATENT DOCUMENTS 0 453 089 A3  10/1991  European Pat. Off. .
0 590 494 A1   4/1994  European Pat. Off. .

*Primary Examiner*—Jeffrey Hofsass
*Assistant Examiner*—Albert K. Wong
*Attorney, Agent, or Firm*—Perman & Green, LLP

[57] ABSTRACT

The invention relates to a method whereby a communication apparatus, advantageously a portable telephone, is set in a keyboard lock mode (130). The communication apparatus comprises a call terminating key, which is used according to the invention so that a short depression thereof only terminates the call (110), but a press-and-hold function, or pressing the key twice in succession or first pressing and then waiting for a given delay (120) sets the apparatus in the keyboard lock mode (130). The invention also relates to a communication apparatus for applying the said method.

18 Claims, 1 Drawing Sheet

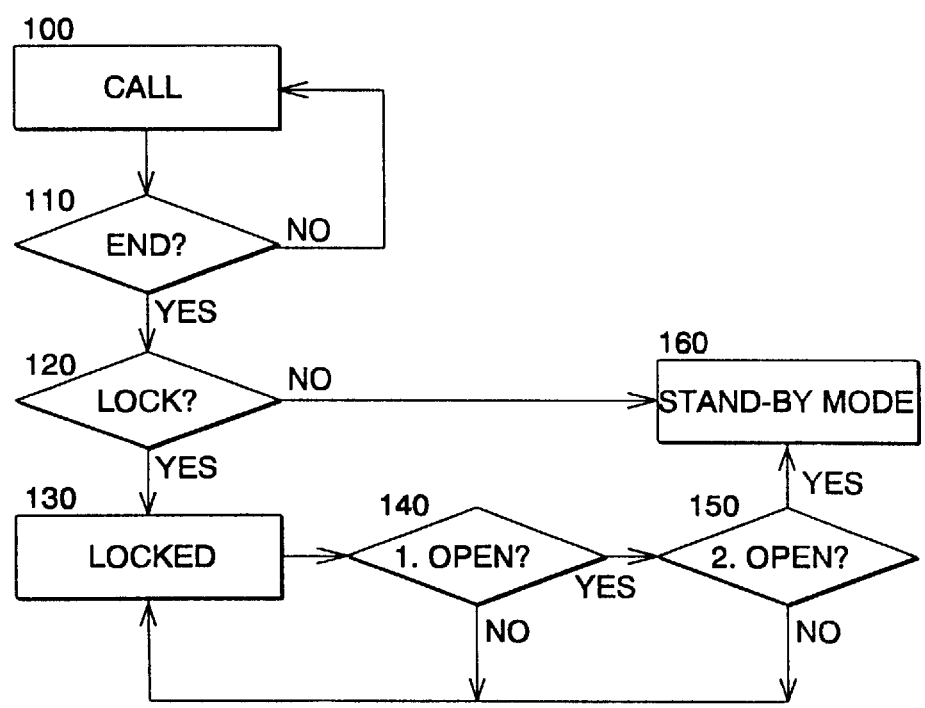

SYSTEM FOR ACTIVATION OF A KEYBOARD LOCK

BACKGROUND OF THE INVENTION

1. Field of the Invention

The invention relates generally to the use of telephone apparatuses provided with keyboard control and particularly to protecting the keypad from inadvertent keystrokes with a method which is easy to apply and economical to realize.

2. Description of the Prior Art

Modem portable telephones—which are small and lightweight and designed to be carried along in a pocket, briefcase or bag—are without exception provided with a keypad for feeding telephone numbers and other information to the apparatus. The keyboard may include various keys, such as number keys, function keys, scanning or arrow keys and ON/OFF keys. Typically, when power is switched on, i.e. the telephone apparatus is on, the user can choose among a number of different functions which are initiated by depressing only one or two keys.

Owing to the easy transportability of a portable telephone, it is often carried in a way which enables inadvertent depressions of the keypad. For example, a portable telephone carried on the belt or in a pocket may hit a chair, door or other object, so that the apparatus registers a depression of a certain key or combination of keys. This may lead to undesired functions: the telephone may for instance be switched off, or it may repeat the last dialled sequence of numbers, which causes harm and discomfort to the user. It is also possible that the user himself inadvertently presses a key when setting the device to be recharged or when otherwise handling it.

Several different arrangements have been suggested in order to eliminate the harmful effects of inadvertent keystrokes. The patent publication EP-A-0,346,639 introduces a telephone provided with a pivotally mounted lid, i. e. a 'flip' element, which is meant to cover the keypad when the telephone is not in use. The flip element hinge comprises a switch preventing the registration of keystrokes also in a case where, when closing the lid, in between the cover and the keypad there is accidentally left a foreign object which depresses a key. The patent publication GB-2,243,117 discloses a method where the user may depress a given sequence of two keys, which activates a so-called programmatic keyboard lock. As a distinction from the mechanical cover such as a lid, the programmatic lock is only a command to the microprocessor controlling the telephone operation so as not to register any keystrokes before the lock is disabled by means of another given keystroke sequence, which can be equal to the sequence enabling the lock.

Moreover, there is known a telephone provided with a separate key for activating and removing the keyboard lock.

The user evaluates the properties of the telephone on the basis of practical usefulness and simplicity in operation. Other important features are reliability in use and low manufacturing costs. A pivotally mounted flip cover is a mechanical solution, which may in the long run deteriorate owing to wearing and getting dirty. A separate lock key takes up space in the keypad and increases manufacturing costs. The key sequences must be memorized, which the user often feels as extra strain.

The object of the present invention is to introduce a method whereby the protection of the keypad against inadvertent keystrokes is realized in an easy fashion, which is advantageous from the point of view of both the user and the manufacturing of the telephone apparatus. Another object of the invention is to introduce a telephone apparatus applying the method of the invention.

SUMMARY OF THE INVENTION

The objects of the invention are achieved by combining the activation of the programmatic keyboard lock to the same key which is used for terminating a call.

The method of invention for protecting a communication apparatus from inadvertent keystrokes is characterized in that the activation of the keyboard lock mode is performed as a response to the given first keystroke command sent by the said first key, which in the said communication apparatus is used for closing the connection.

The invention also relates to a communication apparatus for applying the above described method. The communication apparatus of the invention, including control means, is according to the first preferred embodiment of the invention characterized in that it comprises delay means for detecting whether the said first key is being pressed down, and means for sending the information as for the depression of the said key to the said control means in order to activate the said keyboard lock mode. According to another preferred embodiment of the invention, the communication apparatus is characterized in that it comprises repetition sensing means in order to detect whether the said first key is depressed several times in succession, and means for sending the information as for the several successive depressions of the said first key to the said control means in order to activate the said keyboard lock mode.

The invention is based on the realization that the user generally activates the keyboard lock immediately after finishing a call. In order to terminate a call, most telephones use a so-called end or on-hook key. When this same key also is provided with a function for activating the keyboard lock, there is achieved a solution which is both easy and quick to use.

However, the user does not want to activate the keyboard lock after every call, and therefore it is advisable to functionally distinguish the ending of a call and the activation of the keyboard lock. In the preferred embodiment, this is carried out so that a short depression of the end key only terminates the call, but a longer depression (press-and-hold) of the key activates the keyboard lock. In an alternative embodiment, the first depression of the end key terminates the call and the second, immediately succeeding depression activates the keyboard lock. In yet another preferred embodiment, the keyboard lock is automatically activated, if within a certain period from the depression of the end key, no other key is depressed.

BRIEF DESCRIPTION OF THE DRAWING

The invention is explained in more detail below, with reference to the described preferred embodiments and the enclosed drawing, which illustrates a flow chart of a preferred embodiment of the method of the invention.

DETAILED DESCRIPTION OF THE PREFERRED EMBODIMENT

The call mode 100, where a call is being performed, is ended when the user depresses the end key at the step 110. Thereafter step 120 checks whether the user presses and holds the key for a given delay period. The length of the delay can be freely chosen by the manufacturer; however, it must not be too short, because a slow user could activate the keyboard lock inadvertently, neither too long, because a busy user could find it frustrating to press the key continuously. A suitable delay is roughly 0.5–2 seconds.

When the keyboard lock 130 is on, the telephone does not react to any other keyboard command but a given lock disable command, which in the preferred embodiment is a sequence formed by two determined keystrokes. It is not advisable to attach the disable command to only one key, unless the said key is particularly protected against inadvertent depression, for instance by embedding it to the level of the telephone shell or by surrounding it with an elevation. A disable command connected to one unprotected key could easily lead to a situation where during transport, exactly the said key is inadvertently depressed, in which case the whole keyboard lock loses its purpose. An inadvertent depression of two given keys in succession and in a given order is less probable, so much so that it can be used for disabling the lock.

In the embodiment represented in the drawing, the disabling is illustrated by two successive checking steps 140, 150, so that only a positive answer for both successive checking steps disables the keyboard lock. If the disabling succeeds, the telephone is returned to the same stand-by mode 160 where it also would have ended directly after the call, if the keyboard lock had not been activated at step 120.

The above described alternative embodiment, where the keyboard lock is activated by depressing the end key twice in quick succession does not cause other changes in the flow chart illustrated in the drawing, except that the checking step 120 is replaced by another checking step, which detects whether the user pressed the key twice. These checking steps, as well as the interpretation of the keyboard commands as such, belong to the prior art technology as such known for the man skilled in the art, and these are not described in further detail here. In an embodiment where the keyboard lock is automatically activated after a given delay after the depression of the end key (or any other key) or after the call is terminated from the other end of the line, the checking step 120 includes a given second delay, during which the telephone only observes whether any of the keys is being pressed. The use of the automatic keyboard lock is advantageously chosen by the user, either to be activated or removed for instance through the function menu. Thus the automatic keyboard lock can also be activated after other functions than telephone calls.

Moreover, an alternative preferred embodiment where the keyboard lock is disabled by pressing a given protected key causes a slight change in the mode chart of the drawing; now the checking steps 140 and 150 are replaced by one single checking step which detects whether the depressed key was the correct one. In yet another preferred embodiment, the user can in advance program a given secret disable sequence in the telephone, so that intruders cannot remove the keyboard lock. Furthermore, in another preferred embodiment the telephone automatically disables the keyboard lock mode when a call is coming in. From the point of view of the invention at hand, it is not particularly essential how the keyboard lock is disabled.

The interpretation of the keyboard commands, as well as the disable and enable functions, can be formed of separate logic circuits; however, with respect to the current portable telephone technology, the most advantageous solution is to program them as commands to be performed by the microprocessor controlling the operation of the telephone. In that case, at the checking step 120 a positive answer causes the microprocessor to perform a command which transfers the telephone into mode 130. Respectively, a negative answer from the checking step 120 makes the microprocessor perform a command which transfers the telephone into mode 160. The programming of the tasks to be performed in the portable telephone, as well as their performance by the microprocessor, both represent technology well known as such.

In the specification above, we have introduced a method and apparatus according to the present invention with reference to a portable telephone as an example. However, it is natural that the same arrangement can be used in all communication devices provided with a keypad and using a given key for terminating the connections. In order to activate the keyboard lock, it is not necessary that the user should have terminated the connections immediately beforehand. For instance a portable telephone can be set in the keyboard lock mode at any moment when power is switched on, according to the invention simply by holding the end key down for the delay time referred to in the above specification.

In the portable telephone according to the invention, there are not needed movable cover members nor a separate lock key for protecting the keypad from inadvertent depressions. Likewise, the user does not have to remember any given multi-key lock sequences, but the keyboard lock is enabled according to a simple and easy routine.

I claim:

1. A method for protecting a communication apparatus provided with a keypad having a multiplicity of depressable keys from inadvertent depressions of said keys, which keys comprise a first key that issues a command for terminating a communication connection (100), said method comprising the steps of:

setting the communication apparatus in a mode where the functioning of the keys in at least part of the keyboard is prevented, so that a keyboard lock mode (130) is established; and activating the setting (120) of the keyboard lock mode as a response to a given first keyboard command issued by said first key, being the one used for terminating the communication connection (100) in said communication apparatus.

2. A method according to claim 1, characterized in that the keyboard lock mode (130) is activated as a response to holding the first key pressed down for a predetermined time, so that the pressing and holding constitutes said given first keyboard command.

3. A method according to claim 1, characterized in that the keyboard lock mode (130) is activated as a response to the pressing of the first key twice in immediate succession, so that the pressing down at least twice in immediate succession constitutes said given first keyboard command.

4. A method to claim 1, characterized in that the keyboard lock mode (130) is activated as a response to the pressing of the first key, if within a given period from the pressing of the first key there are not given any other keyboard commands.

5. A method according to claim 1, characterized in that said keyboard lock mode (130) is removed as a response to a second given keyboard command (140, 150), which is different from said given first keyboard command.

6. A method according to claim 5, characterized in that in the keyboard lock mode (130), the functions caused by all other keys are prevented, except for those keys that are needed for giving said second given keyboard command (140, 150).

7. A communication apparatus, comprising:

a keyboard for producing commands indicative of functions to be performed, means for interpreting the keyboard commands given by the keyboard and producing functions indicated thereby, control means for producing a temporary prevention of the producing of the functions caused by at least part of the keys in the keyboard, so that there is formed a keyboard lock mode, and a first key in said keyboard for giving the keyboard command to the effect of terminating a communication, characterized in that the apparatus further comprises:

means for detecting when said first key gives said keyboard command to terminate a communication and producing a signal indicative of said detection, and means for transmitting the indicative signal as to the first key giving said keyboard command to the control means in order to form a keyboard lock mode when so indicated.

8. Apparatus according to claim 7, wherein said first key is a depressable key and said detecting means comprises means, responsive to the holding of the first key pressed down for a predetermined time, for producing said indicative signal activating the keyboard lock mode (130).

9. Apparatus according to claim 7, wherein said first key is a depressable key and said detecting means comprises means, responsive to the pressing of the first key twice in immediate succession, for producing said indicative signal activating the keyboard lock mode (130).

10. Apparatus according to claim 7, wherein said first key is a depressable key and said detecting means comprises means, responsive to the pressing of the first key, for producing said indicative signal activating the keyboard lock mode (130), if within a given period from the pressing of the first key there are not given any other keyboard commands.

11. Apparatus according to claim 7, further comprising means, responsive to a second keyboard command (140, 150), which is different from said keyboard command of said first key, for removing said keyboard lock mode (130).

12. Apparatus according to claim 11, wherein said control means comprises means, responsive to said indicative signal, for forming said keyboard lock mode (130), such that the functions caused by all of the keys in the keyboard are prevented, except for those keys that are needed for giving said second keyboard command (140, 150).

13. A communication apparatus, comprising:

a keyboard having a multiplicity of depressable keys for producing commands indicative of functions to be performed, means for interpreting the keyboard commands given by said depressable keys of the keyboard and producing functions indicated thereby, control means for producing a temporary prevention of the producing of the functions caused by at least part of the keys of the keyboard, so that there is formed a keyboard lock mode, a first key in said keyboard for giving the keyboard command when pressed down to the effect of terminating a communication, characterized in that the apparatus further comprises:

means for detecting the manner in which the first key is pressed down and producing a signal indicative thereof, and means for transmitting said indicative signal to the control means in order to form the keyboard lock mode.

14. Apparatus according to claim 13, wherein said detecting means comprises means, responsive to the holding of the first key pressed down for a predetermined time, for producing said indicative signal activating the keyboard lock mode (130).

15. Apparatus according to claim 13, wherein said detecting means comprises means, responsive to the pressing of the first key twice in immediate succession, for producing said indicative signal activating the keyboard lock mode (130).

16. Apparatus according to claim 13, wherein said detecting means comprises means, responsive to the pressing of the first key, for producing said indicative signal activating the keyboard lock mode (130), if within a given period from the pressing of the first key there are not given any other keyboard commands.

17. Apparatus according to claim 13, further comprising means, responsive to a second keyboard command (140, 150), which is different from said keyboard command of said first key, for removing said keyboard lock mode (130).

18. Apparatus according to claim 17, wherein said control means comprises means, responsive to said indicative signal, for forming said keyboard lock mode (130), such that the functions caused by all of the keys in the keyboard are prevented, except for those keys that are needed for giving said second keyboard command (140, 150).

* * * * *